(12) United States Patent
Yamamoto et al.

(10) Patent No.: US 11,264,859 B2
(45) Date of Patent: Mar. 1, 2022

(54) ROTARY ELECTRIC MACHINE

(71) Applicant: Mitsubishi Electric Corporation, Tokyo (JP)

(72) Inventors: Yukihiro Yamamoto, Tokyo (JP); Takanori Komatsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/613,434

(22) PCT Filed: Jul. 14, 2017

(86) PCT No.: PCT/JP2017/025763
§ 371 (c)(1),
(2) Date: Nov. 14, 2019

(87) PCT Pub. No.: WO2019/012693
PCT Pub. Date: Jan. 17, 2019

(65) Prior Publication Data
US 2020/0169143 A1    May 28, 2020

(51) Int. Cl.
*H02K 5/16* (2006.01)
*H02K 1/27* (2006.01)
(Continued)

(52) U.S. Cl.
CPC ........... *H02K 5/161* (2013.01); *H02K 1/2713* (2013.01); *H02K 1/28* (2013.01)

(58) Field of Classification Search
CPC ........ H02K 5/161; H02K 1/2713; H02K 1/28; H02K 7/083; H02K 11/215; H02K 29/08; G01D 5/12; G01D 5/245
See application file for complete search history.

(56) References Cited

U.S. PATENT DOCUMENTS

| | | | |
|---|---|---|---|
| 2002/0117914 A1 | 8/2002 | Doi et al. | |
| 2009/0123098 A1* | 5/2009 | Takahashi | G01P 3/487 384/448 |

(Continued)

FOREIGN PATENT DOCUMENTS

| | | |
|---|---|---|
| CN | 203691192 U | 7/2014 |
| CN | 204810102 U | 11/2015 |

(Continued)

OTHER PUBLICATIONS

International Search Report and Written Opinion dated Aug. 29, 2017 for PCT/JP2017/025763 filed on Jul. 14, 2017, 10 pages including English Translation of the International Search Report.

(Continued)

*Primary Examiner* — Tulsidas C Patel
*Assistant Examiner* — Riley Owen Stout
(74) *Attorney, Agent, or Firm* — Xsensus LLP

(57) ABSTRACT

A rotary electric machine includes: a housing; a stator that is disposed in the housing; a rotating shaft that is rotatably disposed in the housing; a rotor that is disposed on the rotating shaft; and a rotational angle detecting apparatus that generates a signal that corresponds to a rotational angle of the rotating shaft. The rotational angle detecting apparatus includes: a magnetism generating body that is disposed on an axial end surface of the rotating shaft; and a magnetic sensor that faces the magnetism generating body. A recess portion is disposed on the end surface. The magnetism generating body is disposed in the recess portion.

8 Claims, 6 Drawing Sheets

(51) Int. Cl.
    *H02K 1/28*       (2006.01)
    *H02K 1/2713*     (2022.01)

(56) References Cited

U.S. PATENT DOCUMENTS

| | | |
|---|---|---|
| 2011/0181221 A1 | 7/2011 | Asahi et al. |
| 2016/0285331 A1 | 9/2016 | Ichikawa et al. |
| 2016/0336837 A1* | 11/2016 | Ohnishi ............. H02K 11/0094 |

FOREIGN PATENT DOCUMENTS

| | | |
|---|---|---|
| JP | 59-141474 U | 9/1984 |
| JP | 1-64027 U | 4/1989 |
| JP | 4-99922 A | 3/1992 |
| JP | 7-38967 U | 7/1995 |
| JP | 2002-252958 A | 9/2002 |
| JP | 2003-324930 A | 11/2003 |
| JP | 2006-233985 A | 9/2006 |
| JP | 2007-89312 A | 4/2007 |
| JP | 2008-185561 A | 8/2008 |
| WO | 2010/038862 A1 | 4/2010 |
| WO | 2013/014071 A2 | 1/2013 |
| WO | 2015/140961 A1 | 9/2015 |

OTHER PUBLICATIONS

Chinese Office Action dated May 7, 2021, in corresponding Chinese Patent Application No. 201780092986.1.
English Translation of Chinese Office Action dated Oct. 9, 2021 in Chinese Application No. 201780092986.1.
Chinese Office Action dated Oct. 9, 2021 in Chinese Application No. 201780092986.1.

\* cited by examiner

US 11,264,859 B2

ROTARY ELECTRIC MACHINE

CROSS-REFERENCE TO RELATED APPLICATION

The present application is based on PCT filing PCT/JP2017/025763, filed Jul. 14, 2017, the entire contents of which are incorporated herein by reference.

TECHNICAL FIELD

The present invention relates to a rotary electric machine that has a rotational angle detecting apparatus that detects a rotational angle of a rotating shaft.

BACKGROUND ART

In a conventional brushless motor, a rotating shaft is rotatably supported in a motor housing by means of a pair of bearings. A pair of permanent magnets are fixed to a first axial end surface of the rotating shaft. A sensor mounting member is fixed to an outer ring of one of the bearings. A circuit board is fixed to the sensor mounting member. An angle detecting portion is disposed on the circuit board. The angle detecting portion includes a magnetic array sensor. The magnetic array sensor faces the permanent magnets (see Patent Literature 1, for example).

CITATION LIST

Patent Literature

Patent Literature 1

Japanese Patent Laid-Open No. 2007-89312 (Gazette)

SUMMARY OF THE INVENTION

Problem to be Solved by the Invention

In conventional brushless motors such as that described above, since the permanent magnets protrude completely from the end surface of the rotating shaft toward the angle detecting portion, an overall axial dimension of the motor is increased by an amount equal to a thickness dimension of the permanent magnets, hindering reductions in size.

The present invention aims to solve the above problems and an object of the present invention is to provide a rotary electric machine in which axial dimensions can be reduced.

Means for Solving the Problem

A rotary electric machine according to the present invention includes: a housing; a rotating shaft that is rotatably disposed in the housing; a bearing that is disposed between the housing and the rotating shaft; a stator that is disposed in the housing; a rotor that is disposed on the rotating shaft; and a rotational angle detecting apparatus that includes: a magnetism generating body that is disposed on an axial end portion of the rotating shaft; and a magnetic sensor that faces the magnetism generating body, the rotational angle detecting apparatus generating a signal that corresponds to a rotational angle of the rotating shaft, wherein: a recess portion is disposed on an axial end surface of the rotating shaft; the magnetism generating body is disposed in the recess portion; and the recess portion and the magnetism generating body are disposed inside the bearing.

Effects of the Invention

In the rotary electric machine according to the present invention, because the recess portion is disposed on the end surface of the rotating shaft, and the magnetism generating body is disposed in the recess portion, and the recess portion and the magnetism generating body are disposed inside the bearing, axial dimensions can be reduced.

DESCRIPTION OF EMBODIMENTS

Preferred embodiments of the present invention will now be explained with reference to the drawings.

Embodiment 1

Figure 1:
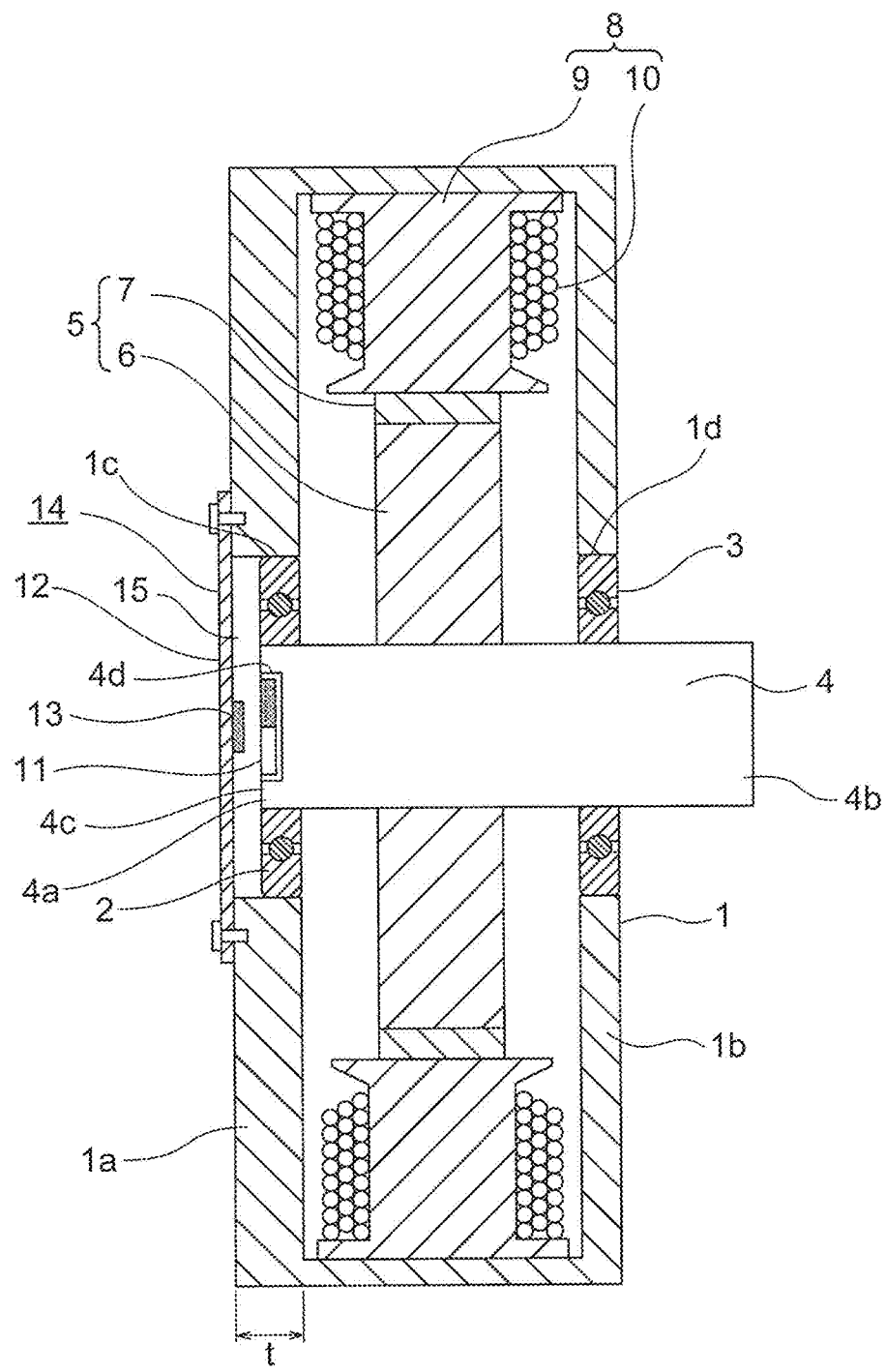
FIG. 1 is a cross section of a rotary electric machine according to Embodiment 1 of the present invention.

FIG. 1 is a cross section of a rotary electric machine according to Embodiment 1 of the present invention. In the figure, a housing 1 has: a flat first shaft supporting portion 1a; and a flat second shaft supporting portion 1b that faces the first shaft supporting portion 1a. A circular first aperture 1c is disposed centrally on the first shaft supporting portion 1a. A circular second aperture 1d is disposed on the second shaft supporting portion 1b.

A first bearing 2 is mounted into the first aperture 1c. A second bearing 3 is mounted into the second opening 1d. A rotating shaft 4 is rotatably supported in the housing 1 by means of the first and second bearings 2 and 3.

A rotor 5 is disposed on the rotating shaft 4. The rotor 5 has: a rotor core 6 that is fixed to the rotating shaft 4; and a plurality of rotor magnets 7 that are fixed to an outer circumferential portion of the rotor core 6. The rotor 5 rotates together with the rotating shaft 4.

A stator 8 is fixed to the housing 1. The stator 8 has: a stator core 9 that is fixed to the housing 1; and a plurality of stator coils 10 that are disposed on the stator core 9. The stator 8 faces the rotor 5 so as to have a gap interposed.

The rotating shaft 4 has: a first end portion 4a that is an end portion near the first shaft supporting portion 1a in an axial direction; and a second end portion 4b that is an end portion near the second shaft supporting portion 1b in the axial direction. The first end portion 4a is held inside the first aperture 1c by the first bearing 2. The second end portion 4b passes through the second bearing 3, and protrudes outside the housing 1.

A recess portion 4d is disposed on an end surface 4c of the rotating shaft 4 near the first end portion 4a in the axial direction. The recess portion 4d is disposed centrally on the end surface 4c. A frontal shape of the recess portion 4d is a circular shape.

A discoid magnetism generating unit 11 is disposed inside the recess portion 4d. The magnetism generating unit 11 rotates together with the rotating shaft 4. In this example, the entire magnetism generating unit 11 is accommodated inside the recess portion 4d in such a way that the magnetism generating unit 11 does not protrude beyond the end surface 4c.

The recess portion 4d and the magnetism generating unit 11 are disposed inside the first bearing 2. In other words, the recess portion 4d and the magnetism generating unit 11 are disposed at a similar or identical position to the first bearing 2 in the axial direction of the rotating shaft 4. In addition, the end surface 4c is flush with an end surface of the second bearing 2 at an opposite end from the rotor 5.

A sensor circuit board 12 is fixed to a surface of the first shaft supporting portion 1a at an opposite end from the second shaft supporting portion 1b. The sensor circuit board 12 is a printed circuit board. The sensor circuit board 12 is fixed to the first shaft supporting portion 1a by a plurality of bolts, for example. In addition, the sensor circuit board 12 covers the first aperture 1c.

A magnetic sensor 13 is disposed on the sensor circuit board 12. The magnetic sensor 13 faces the magnetism generating unit 11 so as to have a gap interposed. A magnetoresistive element, for example, is used as the magnetic sensor 13.

A rotational angle detecting apparatus 14 includes the magnetism generating unit 11, the sensor circuit board 12, and the magnetic sensor 13. The rotational angle detecting apparatus 14 generates a signal that correspond to the rotational angle of the rotating shaft 4. If the rotary electric machine is a motor, the signal that is generated by the rotational angle detecting apparatus 14 is sent to a control portion (not shown) that controls rotation of the motor.

A thickness dimension t of the first shaft supporting portion 1a, i.e., a longitudinal dimension of the first aperture 1c in the axial direction of the rotating shaft 4 is greater than a dimension of the first bearing 2 in the axial direction of the rotating shaft 4. A space 15 is thereby formed between the first bearing 2 and the sensor circuit board 12 inside the first aperture 1c. The magnetic sensor 13 is disposed inside the space 15.

Figure 2:
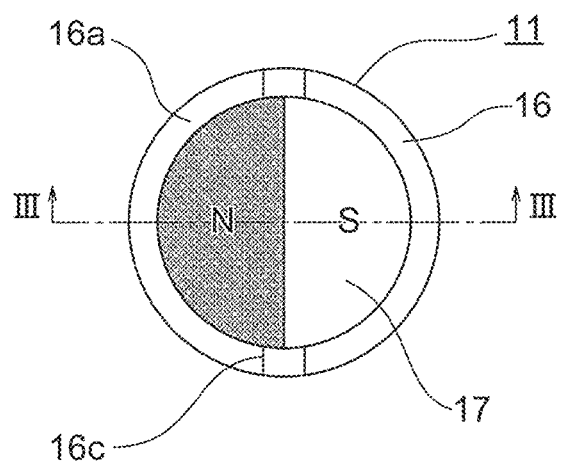
FIG. 2 is a front elevation that shows a magnetism generating unit from FIG. 1.
Figure 3:
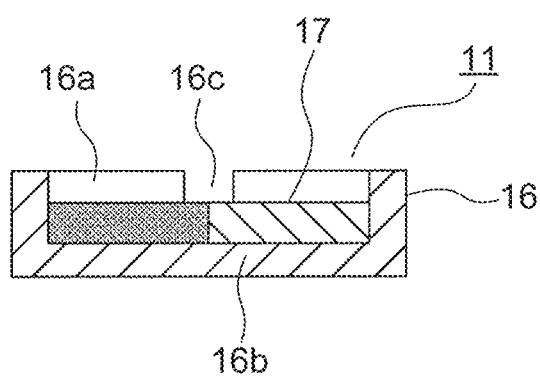
FIG. 3 is a cross section that is taken along Line III-III in FIG. 2.

FIG. 2 is a front elevation that shows the magnetism generating unit 11 from FIG. 1, and FIG. 3 is a cross section that is taken along Line III-III in FIG. 2. The magnetism generating unit 11 has: a case 16; and a discoid magnetism generating body 17 that is accommodated inside the case 16.

The case 16 has: a cylindrical portion 16a; and a bottom portion 16b that closes a first axial end of the cylindrical portion 16a. The cylindrical portion 16a protrudes further toward the magnetic sensor 13 than the surface of the magnetism generating body 17 that faces the magnetic sensor 13.

Notches 16c are disposed on the cylindrical portion 16a at a plurality of circumferential positions. The notches 16c are used during circumferential positioning of the magnetism generating body 17. In this example, two notches 16c are disposed on the cylindrical portion 16a. The notches 16c are disposed so as to have point symmetry around the cylindrical portion 16a. The notches 16c face the sensor circuit board 12.

The case 16 is constituted by a non-magnetic body. A resin, aluminum, or brass, for example, can be used as a material for the case 16.

The magnetism generating body 17 is one in which two (first and second) semicircular permanent magnets are integrated. The two permanent magnets are magnetized so as to be oriented in opposite directions to each other in the axial direction of the rotating shaft 4. Specifically, a North-seeking (N) pole of the first permanent magnet and a South-seeking (S) pole of the second permanent magnet face the magnetic sensor 13.

The magnetism generating body 17 can be formed by magnetizing material for a bonded magnet after injecting it into the case 16, for example. A magnetized discoid magnetism generating body 17 may alternatively be fitted inside the case 16.

In order to detect the relative angle between the rotor magnets 7 and the stator coils 10, it is necessary to set the magnetism generating body 17 to a certain angle relative to the rotor magnets 7. In other words, it is necessary to position the magnetism generating body 17 in the circumferential direction of the rotating shaft 4. The notches 16c are used for the purpose of positioning the magnetism generating body 17 in the circumferential direction.

The case 16 is fixed inside the recess portion 4d using an adhesive. The case 16 is inserted into the recess portion 4d, and then the positioning of the magnetism generating body 17 in the circumferential direction is performed by hooking a jig or a workers finger on the notches 16c and rotating the case 16 before the adhesive cures. The adhesive is then allowed to cure.

The guide when positioning of the magnetism generating body 17 is performed is disposed on the end surface 4c of the rotating shaft 4. In this example, the notches 16c are disposed on an extension of a boundary between the two permanent magnets, and the notches 16c themselves constitute the guide for positioning the magnetism generating body 17.

In a rotary electric machine of this kind, since the magnetism generating unit 11 is disposed inside the recess portion 4d, and the recess portion 4d and the magnetism generating unit 11 are disposed inside the first bearing 2, the magnetic sensor 13 can be disposed closer to the end surface 4c, enabling overall axial dimensions to be reduced.

If the recess portion is not disposed on the end surface 4c, then the thickness dimension t of the first shaft supporting portion 1a is increased, since the magnetic sensor 13 is separated from the end surface 4c by an amount proportionate to the thickness of the magnetism generating unit 11. In contrast to that, by disposing the recess portion 4d on the end surface 4c and accommodating the magnetism generating unit 11 inside the recess portion 4d, the thickness dimension t of the first shaft supporting portion 1a can be reduced.

Because the magnetism generating body 17 is accommodated in the case 16, the magnetism generating body 17 can be disposed at a more precise position inside the recess portion 4d while protecting the magnetism generating body 17.

In addition, because the case 16, which is constituted by a non-magnetic body, is used, the magnetism generating body 17 can be formed easily inside the case 16.

Furthermore, because the notches 16c are disposed on the cylindrical portion 16a, positioning of the magnetism generating body 17 in the circumferential direction can be performed easily and more accurately.

Moreover, in the above example, two notches 16c are disposed, but the number of notches 16c may alternatively be one, or three or more.

Figure 4:
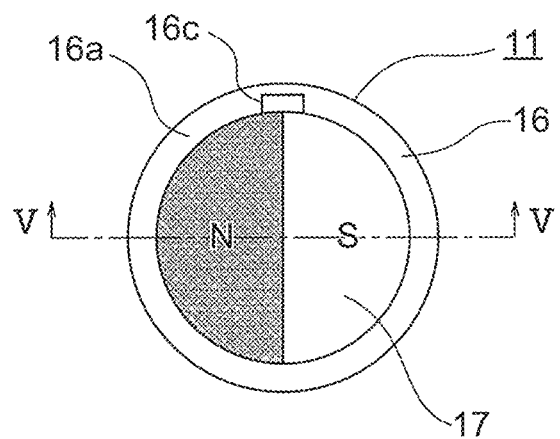
FIG. 4 is a front elevation that shows a variation of the magnetism generating unit in FIG. 2.
Figure 5:
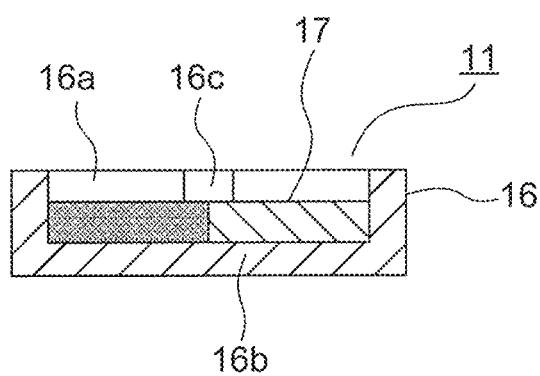
FIG. 5 is a cross section that is taken along Line V-V in FIG. 4.

In the above example, the notches 16c are disposed completely across a thickness of the cylindrical portion 16a, but the notches 16c may alternatively be disposed on a portion of the thickness, as shown in FIGS. 4 and 5.

In addition, the positioning of the magnetism generating body 17 may alternatively be performed without the notches 16c, using a jig.

Embodiment 2

Figure 6:
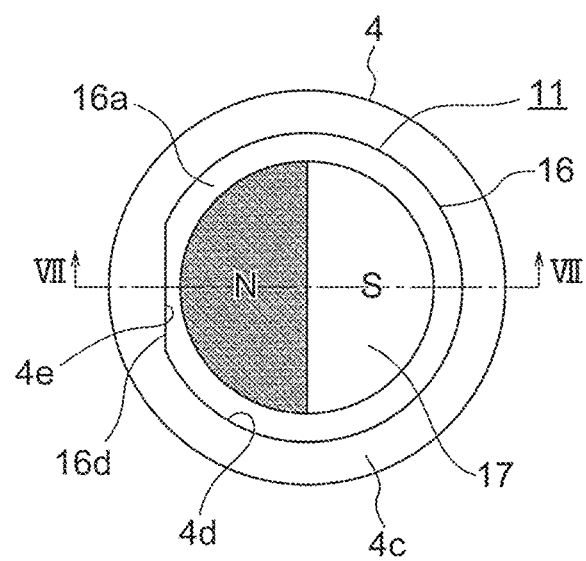
FIG. 6 is a front elevation that shows part of a rotary electric machine according to Embodiment 2 of the present invention.
Figure 7:
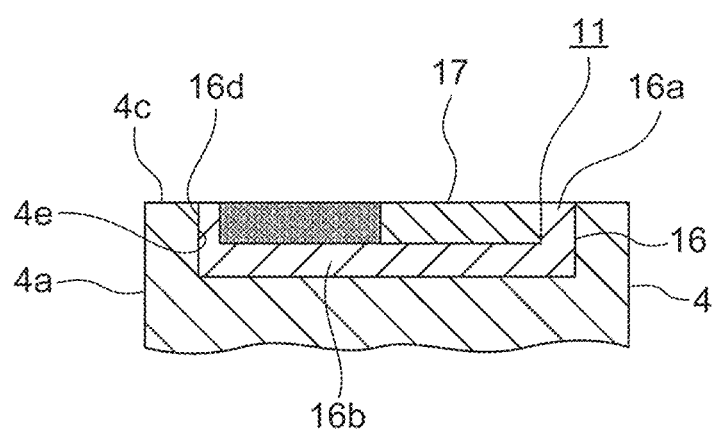
FIG. 7 is a cross section that is taken along Line VII-VII in FIG. 6.

Next, FIG. 6 is a front elevation that shows part of a rotary electric machine according to Embodiment 2 of the present invention, and FIG. 7 is a cross section that is taken along Line VII-VII in FIG. 6. In Embodiment 2, an inner wall positioning surface 4e is disposed to an inner wall of a recess portion 4d. A case positioning surface 16d is disposed on a portion of an outer circumferential surface of a cylindrical portion 16a.

The inner wall positioning surface 4e and the case positioning surface 16d are rectangular flat surfaces of identical size. Positioning of a magnetism generating body 17 in the circumferential direction is performed by aligning the case positioning surface 16d with the inner wall positioning surface 4e. An end surface of the cylindrical portion 16a that is near a magnetic sensor 13 is flush with an end surface of the magnetism generating body 17 that is near the magnetic sensor 13. A remainder of the configuration is similar or identical to that of Embodiment 1.

In such a construction, when inserting the magnetism generating unit 11 into the recess portion 4d, positioning of the magnetism generating body 17 in the circumferential direction can be performed easily and more accurately by aligning the case positioning surface 16d with the inner wall positioning surface 4e.

Since the end surface of the cylindrical portion 16a that is near the magnetic sensor 13 is flush with the end surface of the magnetism generating body 17 that is near the magnetic sensor 13, a depth dimension of the recess portion 4d can be reduced.

Moreover, the inner wall positioning surfaces 4e and the case positioning surfaces 16d are not limited to the shapes and numbers in the above examples.

By keeping the inner wall of the recess portion 4d a circular shape, and disposing flat surfaces that are similar or identical to the case positioning surface 16d at a plurality of positions on the outer circumference of the cylindrical portion 16a, those flat surfaces can also be used as the notches according to Embodiment 1.

In addition, an end surface of the cylindrical portion 16a that is near the magnetic sensor 13 may alternatively not be flush with the end surface of the magnetism generating body 17 that is near the magnetic sensor 13.

Furthermore, in the above examples, two magnetic poles are formed on a surface of the magnetism generating body 17 that faces the magnetic sensor 13, but the number of magnetic poles on the magnetism generating body that face the magnetic sensor are not limited thereto, and may alternatively be four, for example.

In Embodiments 1 and 2, the entire magnetism generating unit 11 is accommodated inside the recess portion 4d, but an end portion that is near the magnetic sensor 13 may be made to protrude beyond the end surface 4c, and if at least a portion of the magnetism generating unit 11 is accommodated inside the recess portion 4d, the axial dimensions of the rotary electric machine can be reduced by that amount.

In addition, the case 16 may alternatively be omitted, and the magnetism generating body 17 disposed directly inside the recess portion 4d.

Figure 8:
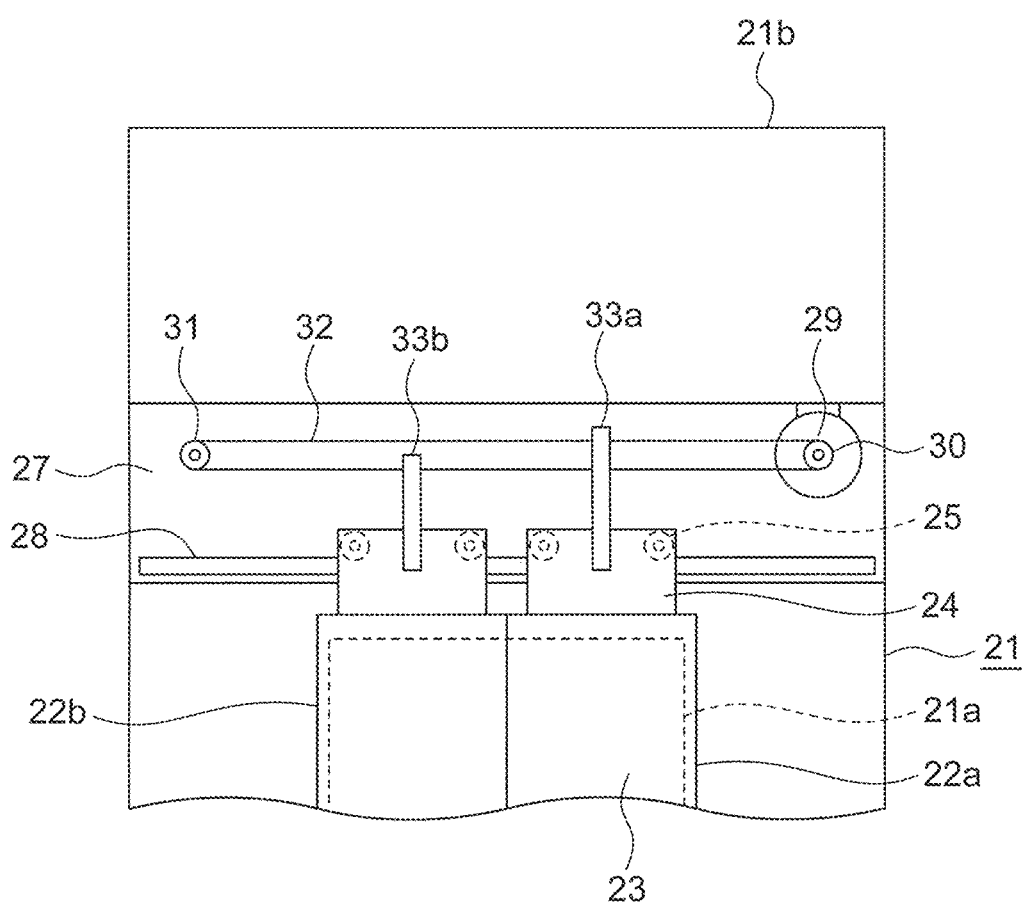
FIG. 8 is a front elevation that shows a portion of an elevator car that constitutes an example of application of the rotary electric machine according to the present invention.
Figure 9:
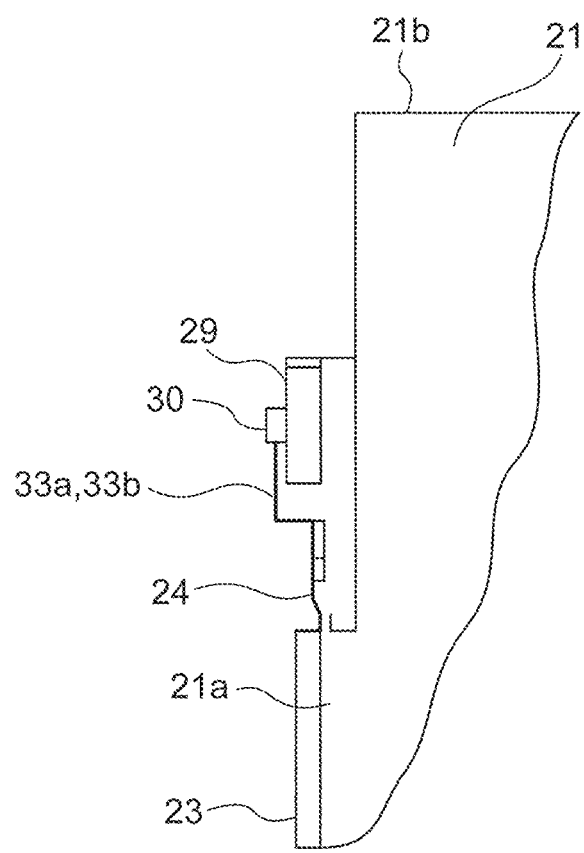
FIG. 9 is a side elevation that shows a portion of the car in FIG. 8.

Now, FIG. 8 is a front elevation that shows a portion of an elevator car that constitutes an example of application of the rotary electric machine according to the present invention, and FIG. 9 is a side elevation that shows a portion of the car in FIG. 8. A car doorway 21a is disposed on a front surface of a car 21, the front surface being a surface on a landing side. The car doorway 21a is opened and closed by first and second car doors 22a and 22b. The first and second car doors 22a and 22b each have: a door panel 23; and a door hanger 24 that is fixed to an upper portion of the door panel 23. A plurality of hanger rollers 25 are disposed on each of the door hangers 24.

A beam 27 is fixed to an upper portion of the front surface of the car 21. A hanger rail 28 is disposed on the beam 27. The first and second car doors 22a and 22b are suspended from the hanger rail 28, and move along the hanger rail 28 during the opening and closing of the car doorway 21a. The hanger rollers 25 move along the hanger rail 28 during the opening and closing operations of the first and second car doors 22a and 22b.

A door motor 29 that constitutes a rotary electric machine is fixed to a first end portion of the beam 27 in a width direction of the car doorway 21a. Any rotary electric machine according to the preferred embodiments above can be used as the door motor 29. A first pulley 30 is fixed to a second end portion 4b of a rotating shaft 4 of the door motor 29.

A second pulley 31 is rotatably disposed on a second end portion of the beam 27 in the width direction of the car doorway 21a. An endless belt 32 is wound around the first pulley 30 and the second pulley 31.

The first car door 22a is connected to an upper portion of the belt 32 by means of a first connecting member 33a. The second car door 22b is connected to a lower portion of the belt 32 by means of a second connecting member 33b. The first and second car doors 22a and 22b perform opening and closing operations along the hanger rail 28 by rotating the first pulley 30 using the door motor 29.

The door motor 29 is disposed in front of the front surface of the car 21. The ceiling 21b of the car 21 is positioned higher than the door motor 29. In other words, the door motor 29 is disposed in a position that is lower than the ceiling 21b.

In an elevator car 21 of this kind, since a thin rotary electric machine such as those shown in the above-mentioned preferred embodiments is used as the door motor 29, the ceiling 21b can be raised to improve the decorative design of the car 21 without having to modify the size of the door apparatus.

If the axial dimensions of the door motor 29 are large, then the door motor 29 cannot be disposed in front of the car 21, and must instead be disposed above the ceiling 21b. In that case, a mechanism is required that transmits the output from the door motor 29 from above the ceiling 21b to the first pulley 30, increasing the size of the door apparatus.

Moreover, the rotary electric machine according to the present invention can also be applied to electric motors other than the elevator door motor 29, to generators, and to generator-motors.

The magnetic sensor 13 is not limited to a magnetoresistive element, and may also be a Hall element, a Hall integrated circuit, or a magnetic encoder, for example.

EXPLANATION OF NUMBERING

1 HOUSING; 2 FIRST BEARING; 4 ROTATING SHAFT; 4a FIRST END PORTION; 4c END SURFACE; 4d RECESS PORTION; 4e INNER WALL POSITIONING SURFACE; 5 ROTOR; 8 STATOR; 13 MAGNETIC SENSOR; 14 ROTATIONAL ANGLE DETECTING APPARATUS; 16 CASE; 16a CYLINDRICAL PORTION; 16b BOTTOM PORTION; 16c NOTCH; 16d CASE POSITIONING SURFACE; 17 MAGNETISM GENERATING BODY; 29 DOOR MOTOR (ROTARY ELECTRIC MACHINE).

The invention claimed is:

1. A rotary electric machine comprising:
a housing;
a rotating shaft that is rotatably disposed in the housing;
a bearing that is disposed between the housing and the rotating shaft;
a stator that is disposed in the housing;
a rotor that is disposed on the rotating shaft; and
a rotational angle detecting apparatus that comprises:
a magnetism generating body that is disposed on an axial end portion of the rotating shaft;
a case that accommodates the magnetism generating body; and
a magnetic sensor that faces the magnetism generating body,
the rotational angle detecting apparatus generating a signal that corresponds to a rotational angle of the rotating shaft,
wherein:
a recess portion is disposed on an axial end surface of the rotating shaft;
the magnetism generating body and the case are disposed in the recess portion;
the recess portion, the magnetism generating body and the case are disposed inside the bearing; and
the case comprises:
a cylindrical portion that has a first axial end and a second axial end; and
a bottom portion that closes the first axial end of the cylindrical portion; and
a notch that is used to rotate the case during circumferential positioning of the magnetism generating body with respect to the rotating shaft is disposed on the second axial end of the cylindrical portion,
wherein:
the cylindrical portion of the case includes two notches, and
the two notches are on opposite sides of the case.

2. The rotary electric machine according to claim 1, wherein:
the magnetism generating body is magnetized in an axial direction of the rotating shaft; and
a plurality of magnetic poles are formed on a surface of the magnetism generating body that faces the magnetic sensor.

3. The rotary electric machine according to claim 2, wherein the magnetism generating body is one in which two semicircular permanent magnets are integrated.

4. The rotary electric machine according to claim 3, wherein a guide when positioning of the magnetism generating body is performed is disposed on the end surface of the rotating shaft.

5. The rotary electric machine according to claim 1, wherein:
the sensor circuit board is fixed to the housing;
the magnetic sensor is disposed on the sensor circuit board; and
the notch faces the sensor circuit board.

6. The rotary electric machine according to claim 1, wherein:
the notch is in the cylindrical portion of the case.

7. The rotary electric machine according to claim 1, wherein:
the two notches are separated from each other by 180 degrees.

8. The rotary electric machine according to claim 1, wherein:
at least a portion of the of the case and the magnetism generating body are disposed in the recess portion.

* * * * *